US011227581B2

(12) United States Patent
Raux

(10) Patent No.: US 11,227,581 B2
(45) Date of Patent: Jan. 18, 2022

(54) SYSTEMS AND METHODS FOR GENERATING A RESPONSE BASED ON TASK-INDEPENDENT CONVERSATIONAL RESPONSES OR TASK-SPECIFIC RESPONSES

(71) Applicant: botbotbotbot Inc., Menlo Park, CA (US)

(72) Inventor: Antoine Raux, Menlo Park, CA (US)

(73) Assignee: botbotbotbot Inc., Menlo Park, CA (US)

( * ) Notice: Subject to any disclaimer, the term of this patent is extended or adjusted under 35 U.S.C. 154(b) by 0 days.

(21) Appl. No.: 16/407,098

(22) Filed: May 8, 2019

(65) Prior Publication Data

US 2020/0027443 A1    Jan. 23, 2020

Related U.S. Application Data

(63) Continuation of application No. 15/959,109, filed on Apr. 20, 2018, now Pat. No. 10,339,919.

(51) Int. Cl.
| | |
|---|---|
| *G10L 15/22* | (2006.01) |
| *G10L 15/06* | (2013.01) |
| *G10L 15/16* | (2006.01) |
| *G06N 3/04* | (2006.01) |
| *G10L 15/26* | (2006.01) |

(52) U.S. Cl.
CPC .......... *G10L 15/063* (2013.01); *G06N 3/0454* (2013.01); *G10L 15/16* (2013.01); *G10L 15/22* (2013.01); *G10L 15/26* (2013.01); *G10L 2015/228* (2013.01)

(58) Field of Classification Search
CPC   G06F 17/2785; G10L 15/22; G10L 2015/225
See application file for complete search history.

(56) References Cited

U.S. PATENT DOCUMENTS

| | | | |
|---|---|---|---|
| 7,752,152 B2 * | 7/2010 | Paek | G10L 15/22 706/20 |
| 10,339,919 B1 | 7/2019 | Raux | |
| 2001/0056349 A1 * | 12/2001 | St. John | G07C 9/00158 704/270 |
| 2002/0002460 A1 * | 1/2002 | Pertrushin | G10L 17/26 704/270 |

(Continued)

OTHER PUBLICATIONS

International Preliminary Report on Patentability received for PCT Patent Application No. PCT/US2019/028294, dated Oct. 29, 2020, 10 pages.

(Continued)

*Primary Examiner* — Michael N Opsasnick
(74) *Attorney, Agent, or Firm* — Dentons US LLP

(57) ABSTRACT

Methods, systems, and apparatus, including computer programs encoded on computer storage media, for generating responses using task-independent conversational systems are provided. In one example method, a response to a user text input is generated by updating a state of the conversation based on the user text input, generating a conversational (task-independent) output, and determining whether to provide a conversational response based on the conversational output, or to additionally generate a task-specific output.

54 Claims, 5 Drawing Sheets

(56) References Cited

U.S. PATENT DOCUMENTS

| | | | | |
|---|---|---|---|---|
| 2004/0225499 | A1* | 11/2004 | Wang | H04M 3/4936 704/257 |
| 2007/0239637 | A1* | 10/2007 | Paek | G10L 15/22 706/20 |
| 2008/0015864 | A1* | 1/2008 | Ross | G10L 15/1822 704/275 |
| 2009/0306995 | A1* | 12/2009 | Weng | G06Q 10/103 705/301 |
| 2014/0089286 | A1* | 3/2014 | Delli Santi | G06F 16/29 707/706 |
| 2014/0195221 | A1* | 7/2014 | Frank | G06F 17/28 704/9 |
| 2014/0310595 | A1* | 10/2014 | Acharya | G06F 9/453 715/706 |
| 2016/0225372 | A1* | 8/2016 | Cheung | G10L 15/22 |
| 2017/0270929 | A1* | 9/2017 | Aleksic | G06F 40/295 |
| 2018/0005629 | A1 | 1/2018 | Crook et al. | |
| 2018/0075846 | A1* | 3/2018 | Gandrabur | G10L 15/22 |
| 2018/0075847 | A1* | 3/2018 | Lee | G06F 16/3329 |
| 2018/0357096 | A1* | 12/2018 | McConnell | G06F 9/4843 |
| 2018/0358006 | A1* | 12/2018 | McConnell | G06F 16/3329 |
| 2021/0073293 | A1* | 3/2021 | Fenton | H04L 51/046 |

OTHER PUBLICATIONS

International Search Report and Written Opinion received for PCT Patent Application No. PCT/US2019/028294, dated Jul. 26, 2019, 12 pages.
Eric, Bilange, "A task independent oral dialogue model", European Chapter of the Association for Computational Linguistics, Association for Computational Linguistics, Apr. 9, 1991, pp. 83-88.
Bonus et al., "A k-Hypotheses+ Other Belief Updating Model", Proc. of the AAAI Workshop on Statistical and Empirical Methods in Spoken Dialogue Systems, vol. 62, 2006, 6 pages.
Bonus et al., "Constructing Accurate Beliefs in Spoken Dialog Systems", Automatic Speech Recognition and Understanding, IEEE, 2005, pp. 272-277.
Bonus et al., "Error Handling in the RavenClaw Dialog Management Architecture", In Proceedings of the conference on Human Language Technology and Empirical Methods in Natural Language Processing, Association for Computational Linguistics, 2005, pp. 225-232.
Bonus et al., "Integrating Multiple Knowledge Sources for Utterance-Level Confidence Annotation in the CMU Communicator Spoken Dialog System", No. CMU-CS-02-190, Carnegie-Mellon Univ Pittsburgh PA School of Computer Science, 2002, 31 pages.
Bonus et al., "LARRI: A Language-Based Maintenance and Repair Assistant", Spoken Multimodal Human-Computer Dialogue in Mobile Environments, 2005, pp. 203-218.
Bohus et al., "RavenClaw: Dialog Management Using Hierarchical Task Decomposition and an Expectation Agenda", Eighth European Conference on Speech Communication and Technology, 2003, 4 pages.
Bonus et al., "Sorry, I didn't catch that!—An Investigation of Non-Understanding Errors and Recovery Strategies", 6th SIGdial Workshop and Discourse and Dialogue, 2005, 16 pages.
Harris et al., "A Research Platform for Multi-Agent Dialogue Dynamics", Robot and Human 11. Interactive Communication, 13th IEEE International Workshop on, IEEE, 2004, pp. 497-502.
Non-Final Office Action received for U.S. Appl. No. 15/959,109, dated Jul. 20, 2018, 13 pages.
Notice of Allowance received for U.S. Appl. No. 15/959,109, dated Feb. 5, 2019, 8 pages.
Oh et al., "Stochastic Language Generation for Spoken Dialogue Systems", Proceedings of the 2000 ANLP/NAACL Workshop on Conversational systems, vol. 3, Association for Computational Linguistics, 2000, 6 pages.
opendial.com, "Flight-booking example", Online Available at: <http://www.opendile-toolkit.net/usermanual/flight-booking-example>, Jun. 15, 2015, 11 pages.
opendial.com, "Open Dial", Online Available at: <http://www.opendiel-toolkit.net/home>, Jun. 22, 2015, 5 pages.
opendial.com, "Step-by-step example", Online Available at: <http://www.opendial-toolkit.net/user-rnanual/step-by-step-example>, Jun. 21, 2015, 22 pages.
Raux et al., "Doing Research on a Deployed Spoken Dialogue System: One Year of Let's Go! Experience", Ninth International Conference on Spoken Language Processing, 2006, 4 pages.
Raux et al., "Let's Go Public! Taking a Spoken Dialog System to the Real World", Ninth European Conference on Speech Communication and Technology, 2005, 4 pages.
Raux et al., "Let's go: Improving Spoken Dialog Systems for the Elderly and Non-Natives", Eighth European Conference on Speech Communication and Technology, 2003, 4 pages.
Seneff et al., "Galaxy-II: A Reference Architecture for Conversational System Development", Fifth International Conference on Spoken Language Processing, 1998, 4 pages.

* cited by examiner

SYSTEMS AND METHODS FOR GENERATING A RESPONSE BASED ON TASK-INDEPENDENT CONVERSATIONAL RESPONSES OR TASK-SPECIFIC RESPONSES

CROSS-REFERENCE TO RELATED APPLICATIONS

This application is a continuation of U.S. patent application Ser. No. 15/959,109 "TASK-INDEPENDENT CONVERSATIONAL SYSTEMS," filed Apr. 20, 2018 and issued Jul. 2, 2019 as U.S. Pat. No. 10,339,919, all of which is incorporated by reference in its entirety herein.

BACKGROUND

This specification relates to dialogue systems.

A dialogue system is a computer system that has conversations with users by generating system outputs in response to user inputs.

For example, during a given conversation, a dialogue system can receive a speech input from the user, convert the speech input to text, and then operate on the text to generate a speech output that is a response to the speech input received from the user.

Dialogue systems can be used to converse with users to accomplish any of a variety of tasks. For example, a dialogue system can be used to allow users to select options from a menu, e.g., food items from a restaurant menu. As another example, a dialogue system can be used to allow users to make a reservation, e.g., a restaurant reservation or a travel reservation.

Some dialogue systems use neural networks as part of generating a system output from a user input.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes how a dialogue system implemented as computer programs on one or more computers in one or more locations can generate a semantic output as part of generating a response to a user input.

More specifically, the system receives a user input as part of a conversation occurring between the system and a user in order to perform a particular task. The system then converts the user input into a semantic input and generates a semantic output from the semantic input using (i) a conversational subsystem that is configured to generate outputs that are conversational and task-independent and (ii) a task subsystem that is configured to generate outputs that are task-specific, i.e., that are specific to the particular task.

The subject matter described in this specification can be implemented in particular embodiments so as to realize one or more of the following advantages. The described dialogue systems include (i) a conversational subsystem that is used to generate responses that are independent of the task being performed and (ii) a task subsystem that is used to generate task-specific responses. Because of this structure, the same conversational subsystem can be re-used across multiple tasks without needing to be re-trained or otherwise customized for each task, reducing the amount of computational resources, e.g., memory and processing power, consumed by the system. Moreover, the conversational subsystem can be trained on training data that is gathered from multiple tasks, allowing the system to make better use of training data and improving the performance of the system. That is, by structuring the dialogue system as described in this specification, the system is able to achieve increased performance on a variety of tasks while using fewer computational resources as compared to conventional systems. In particular, the dialogue system is able to leverage the aspects of conversations that are common across multiple tasks to effectively complete the current task with higher quality, while using fewer computational resources, or both relative to conventional systems.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
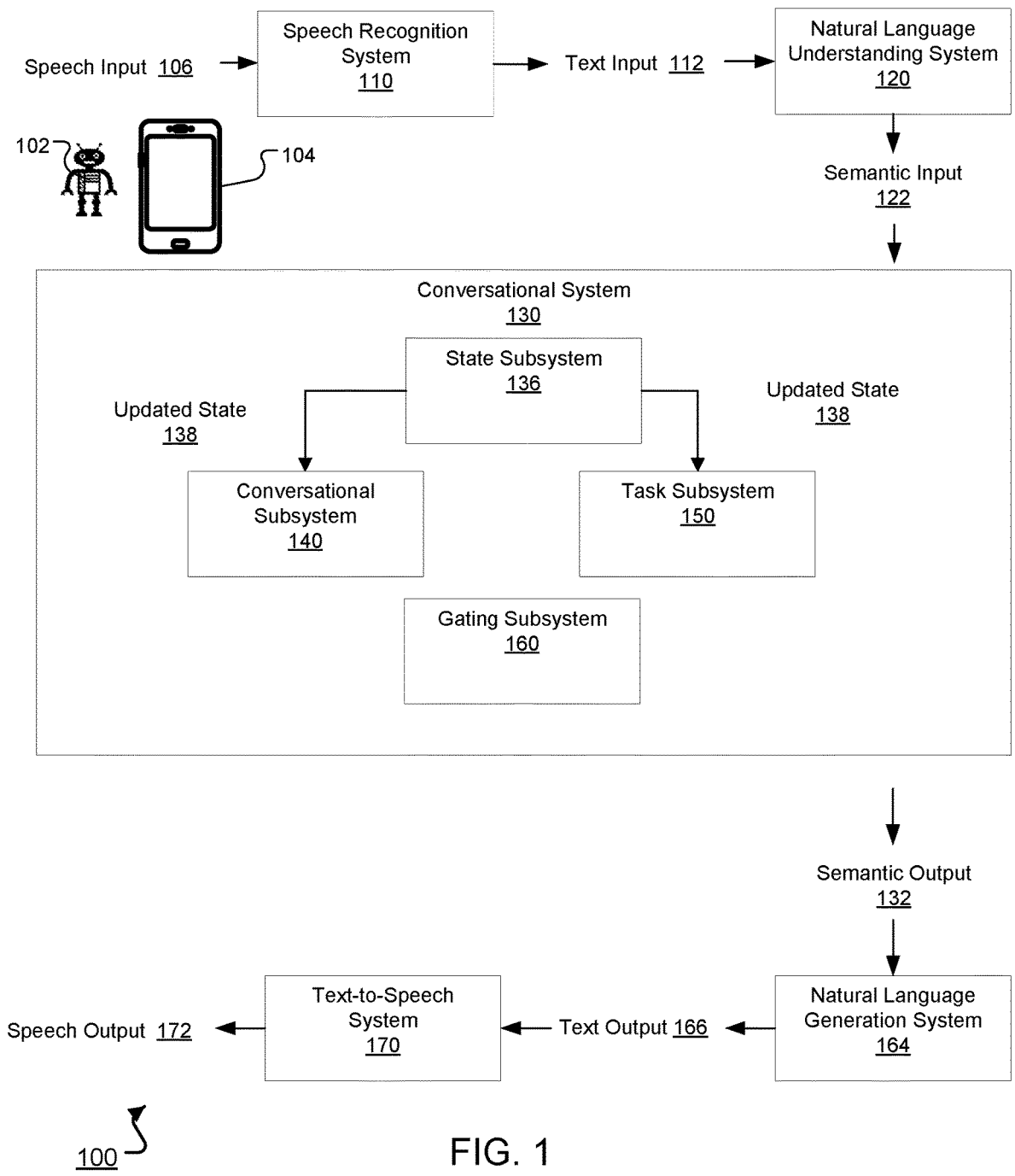
FIG. 1 shows an example dialogue system.

FIG. 1 shows an example dialogue system 100. The dialogue system 100 is an example of a system implemented as computer programs on one or more computers in one or more locations, in which the systems, components, and techniques described below are implemented.

The dialogue system 100 is a system that engages in conversations with users of the system.

Generally, each conversation is an attempt by the dialogue system 100 to interact with a user to complete a task for the user. Examples of tasks can include a food delivery task, a shopping task, a restaurant reservation task, a travel reservation task, or a route planning navigation task, among many others.

In some cases, the task is determined before the conversation begins. For example, the dialogue system 100 may only be configured to perform a single task. As another example, the task to be completed by a given conversation may be defined by the interface through which the user inputs are received during the conversation. That is, each of multiple tasks that the system is configured to complete is initiated by a user input submitted through a corresponding interface.

In other cases, the dialogue system 100 determines the task to be completed based on inputs submitted by the user during the conversation. For example, the system may be configured to perform multiple tasks, and the dialogue system 100 can determine which task to perform based on one or more initial user inputs during the conversation.

During a given conversation with a user 102 of a user device 104, the dialogue system 100 receives a speech input 106 from the user device 104, e.g., over a data communication network, and, in response, generates a speech output 172 and provides the speech output 172 for playback on the user device 104, e.g., also over the data communication network.

To generate the speech output 172, a speech recognition system 110 in the dialogue system 100 receives the speech input 106 and converts the speech input 106 into a text input 112 that is a transcription of the speech input. The speech recognition system 110 can convert the speech into text using any appropriate conventional automatic speech recognition (ASR) technique, e.g., a Hidden Markov Model (HMM) based recognition technique or a neural network based recognition technique.

Once the text input 112 has been generated, a natural language understanding (NLU) system 120 converts the text input 112 into a semantic input 122. Generally, the semantic input 122 represents the text input 112 in a way that captures the semantics of the text input 112.

The semantic input 122 can represent the semantics of the text input 112 in any of a variety of ways.

For example, the semantic input 122 can be a frame that identifies (i) the intent of the text input 112 and (ii) values for one or more slots corresponding to the intent. Each slot corresponding to the intent is a slot whose value is required to be filled in order for the intent to be satisfied. For example, when the intent is to order a pizza from a restaurant menu, slots required to be filled include one or more slots for toppings for the pizza and a slot for the size of the pizza. In some cases, the semantic input 122 can also include confidence scores for the slot values that indicate how confident the NLU is that the slot value has been properly understood by the NLU.

The dialogue system 100 also includes a conversational system 130 that receives the semantic input 122 and processes the semantic input 122 to generate a semantic output 132. The semantic output 132 defines the semantics of a response to the user input. For example, the semantic output can include an output intent and values for one or more slots corresponding to the output intent.

In particular, the conversational system 130 includes a state subsystem 136, a conversational subsystem 140, a task subsystem 150, and a gating subsystem 160.

The state subsystem 136 receives the semantic input 122 and uses the semantic input 122 to update the current state of the conversation to generate an updated state 136.

The current state of the conversation represents the information collected by the system 100 from the user during the current conversation. In particular, the current state of the conversation includes data identifying one or more intents for the conversation and, for each slot of each intent, data specifying the current state of the slot. The current state of the slot either specifies that the value of the slot is missing, i.e., has not yet been specified by the user during the conversation, or identifies one or more possible values for the slot and a confidence score for each possible value. The confidence score for a given possible value specifies how confident the system 100 is that the possible value is the user's intended value for the corresponding slot.

The state subsystem 136 updates the current state by updating the values and the confidence scores of the slot(s) whose values are impacted by the semantic input 122. That is, the state subsystem 136 can add a possible value to a slot, modify the confidence score for an existing possible value of a slot, or both using the semantic input 122.

Generally, the conversational subsystem 140 generates a conversational input from at least the updated conversation state 136 and processes the conversational input to generate a conversational output. The conversational output defines a response or a portion of a response to the system input that is independent of the task that is being performed.

As an example, one type of response that is independent of the task that is being performed is a grounding response that ensures that the user and the system have a common understanding of the state of the conversation. Examples of grounding responses include responses that confirm that the user input was understood, i.e., a response that confirms to the user the intent or the slot value that the NLU inferred from their latest input, or responses that seek to clarify some portion of the user input, i.e., to disambiguate a reference to an entity in the user input or to ask the user to re-submit a user input that was not recognized correctly.

As another example, another portion of a response that is independent of the task that is being performed is a response that progresses the conversation through a subtask of a type that is common to many different tasks. Examples of such subtask types include selecting one or more items from a list or menu of items, walking through steps of a procedure, and so on. In the list selection example, while the items in the list will be different for different tasks, the mechanism by which the user is guided through selecting the items will be shared between the different tasks. That is, the conversational subsystem can generate responses that guide the user through the list, with the task-specific items being filled in by another component of the system 100.

Advantageously, because the conversational inputs and the conversational outputs are abstracted away from the specifics of the particular task, the system can use the same conversational subsystem for multiple tasks.

In some implementations, the conversational subsystem is a rule-based system. A rule-based system is a system that applies a set of pre-determined rules to map the conversational input to the conversational output.

In some other implementations, the conversational subsystem includes a machine learning model that has been trained to process the conversational input to generate the conversational output. In these implementations, the system can use the same machine learning model for multiple different tasks without needing to re-train the machine learning model.

For example, the machine learning model can be a neural network, e.g., a deep feedforward or recurrent neural network.

As another example, the machine learning model can be an Hidden Markov Model.

As another example, the machine learning model can be a Conditional Random Fields-based model.

As yet another example, the machine learning model can be a Finite-State Transducer.

While several example types of machine learning models have been described here, any appropriate machine learning technique can be used to learn a model that can be used to generate conversational outputs.

An example technique for training a conversational machine learning model is described below with reference to FIG. 5.

The task subsystem 150 generates a task input from at least the updated conversational state 136 and then generates a task output from the task input. The task output is a response that is specific to the particular task that is being engaged in during the current conversation.

Like the conversational subsystem 140, in some cases the task subsystem 150 implements a machine learning model and processes the task input using the machine learning model to generate the task output. In other cases, the task subsystem 150 is a rule-based system that employs a set of pre-determined rules to map the task input to a task output.

Examples of rule-base systems that can be adapted to generate task or conversational outputs include the Raven-Claw system, described at http://www.cs.cmu.edu/~dbohus/ravenclaw-olympus/index-dan.html and the OpenDial system, described at http://www.opendial-toolkit.net/home.

Because the task subsystem 150 is specific to the particular task, in implementations where the system 100 is configured to perform multiple tasks, the system maintains multiple task subsystems, one for each task that the system is configured to perform. When the determination is made as to which task a current conversation corresponds to, the system selects the appropriate task subsystem from the maintained subsystems for use during the conversation.

The gating subsystem 160 generates the semantic output 132 using the conversational output, the task output, or both.

The conversational system 130 and various techniques for generating the semantic output 132 from the semantic input 122 will be discussed in more detail below with reference to FIGS. 2-5.

The dialogue system 100 also includes a natural language generation system 164 that receives the semantic output 132 and generates a text output 166 that conveys the semantics defined by the semantic output 132. For example, the natural language generation system 164 can generate text that reflects the output intent and slot values included in the semantic output 132.

Once the text output 166 has been generated, a text-to-speech system 170 converts the text output 166 into the speech output 172, i.e., into speech that verbalizes the text output 166. The text-to-speech system 170 can use any appropriate conventional text-to-speech technique to convert the text output 166 into the speech output 172, e.g., an HMM-based text-to-speech technique or a neural network-based text-to-speech technique.

In the example of FIG. 1, the speech recognition system 110, the natural language understanding system 120, the conversational system 130, the natural language generation system 164, and the text-to-speech system 170 are all described as separate components of the dialogue system 100. In some other implementations, however, the functionality of two or more of these systems may be implemented as part of a single system. For example, a single system may directly process a speech input to generate a semantic representation of the speech input.

Additionally, in the example of FIG. 1, the system input and output are both illustrated as being speech. However, in other examples, the modality of the system input, the modality of the system output, or both may be different. For example, both the input modality and the output modality may be text. As another example, the input modality may be text while the output modality is speech or vice versa.

Figure 2A:
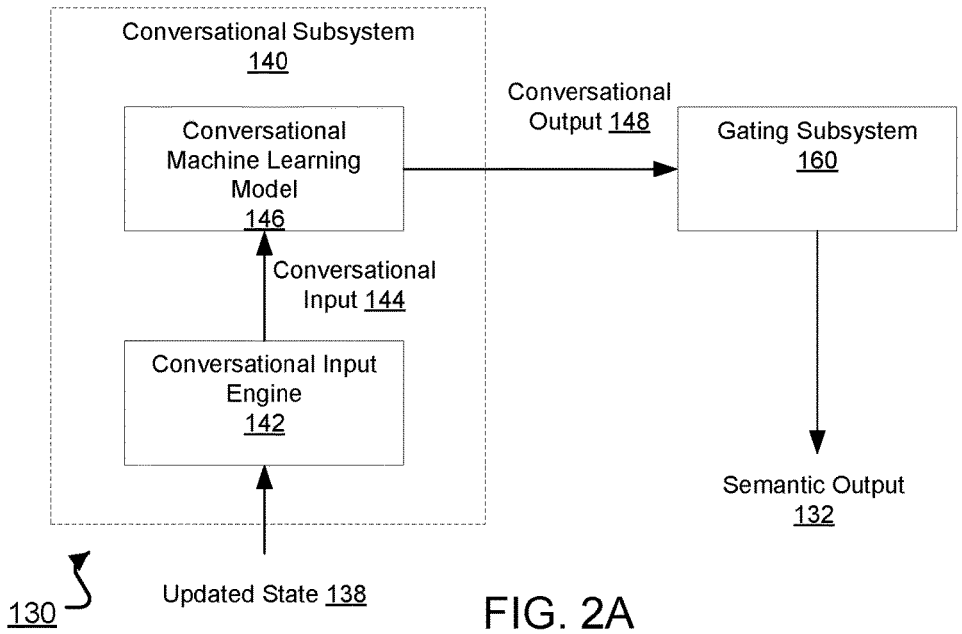
FIG. 2A-4 are diagrams that show example configurations of the conversational subsystem.

FIG. 2A is a diagram showing an example configuration of the conversational subsystem 140 of FIG. 1.

In the example of FIG. 2A, the conversational subsystem 140 includes a conversational input engine 142 and a conversational machine learning model 146.

The conversational input engine 142 receives the updated state 138 and generates a conversational input 144 for processing by the conversational machine learning model 146.

Generally, the conversational input engine 142 generates the conversational input 144 by genericizing the updated state 138 to remove the task-dependent aspects of the updated state 138 while maintaining the conversational context of the conversation.

In some implementations, the conversational input engine 142 generates the conversational input by genericizing the intents and slots in the updated state 138 and providing the genericized intents and slots in association with the confidence scores. For example, the system can map each slot that is missing a value to one predetermined vector and each slot that has a possible value to another predetermined vector.

In other implementations, the conversational input engine 142 maps each intent and each value to a feature vector in a feature space that is shared across tasks. In other words, the conversational input engine 142 generates the conversational input by mapping each intent and value to a numeric embedding in an embedding space that is shared between different tasks, i.e., to a vector in the embedding space, using an embedding neural network layer. The embedding space is shared between tasks because each intent and value is mapped to the same dimensionality regardless of the task that is currently being engaged in.

In some cases, the mappings from intent and slot value to the shared feature space are pre-determined, i.e., the parameters of the embedding layer are pre-trained and fixed. In other cases, the mappings are learned jointly during the training of the conversational machine learning model 146. That is, the system 100 adjusts the values of the parameters of the embedding neural network layer based on gradients backpropagated through the conversational machine learning model 146 during the training of the conversational machine learning model 146.

In some implementations, the conversation input engine 142 also processes the semantic input in a similar manner as the updated state and includes the genericized semantic input as part of the conversational input.

In some implementations, the conversational machine learning model 146 is a feedforward neural network, e.g., a deep feedforward neural network that includes multiple fully-connected layers, multiple convolutional layers, or both.

In some other implementations, the conversational machine learning model 146 is a recurrent neural network, e.g., an LSTM neural network, gated recurrent unit (GRU) recurrent neural network, or other recurrent neural network, that maintains an internal state and updates the internal state as part of generating each conversational output. In this case, the conversational neural network 146 can store information from previously processed conversational inputs and access that information when generating later conversational outputs through its internal state.

As described above, the conversational machine learning model 146 can also be implemented using another appropriate machine learning technique.

The conversational machine learning model 146 generates a conversational output 148 that defines a conversational intent for use as part of or all of the semantic output 132.

In some implementations, the conversational output 148 includes a score distribution over possible output intent-slot value combinations in a predetermined set of conversational intent-slot value combinations. Each conversational intent-slot value combination defines the semantics of an output that is independent of the current task. For example, one intent-slot value may ask the user to repeat the previous utterance. As another example, another intent-slot value may ask the user to select an item from a list of items, with the task-specific list being generated independently of the conversational output. In some of these implementations, the conversational output 148 also includes an output for a null combination that indicates that a conversational output is not appropriate as a response to the current user input.

In some other implementations, the conversational output 148 is a vector in a high-dimensional space, i.e., a feature vector.

The system 100 trains the conversational machine learning model 146 to generate conversational outputs that assist in successfully completing the particular task without requiring an excessive amount of input from the user. In particular, because the inputs and outputs of the conversational machine learning model 146 are not specific to any one task, the system 100 can train the conversational machine learning model on training data from conversations that include multiple different tasks. Training the conversational machine learning model 146 will be described in more detail below with reference to FIG. 5.

In the example configuration of FIG. 2A, the gating subsystem 160 receives the conversational output 148 and determines whether to provide the conversational intent defined by the conversational output 148 as the semantic output 132 or to use the task subsystem 150 to generate a task output to be included in the semantic output 132 instead of or in addition to the conversational intent.

In some implementations, the gating subsystem 160 determines how to proceed with respect to generating the semantic output 132 by applying a set of rules. For example, when the output includes a score distribution, the set of rules can specify that the gating subsystem 160 select the intent-value combination having the highest score and provide the intent-value combination as the semantic output 132 if sufficient uncertainty exists as to any of the possible values in the updated state or in the semantic input. For example, sufficient uncertainty can be found to exist if any of the confidence scores in the updated state or the semantic input fall below a threshold score. If sufficient uncertainty does not exist, the gating subsystem 160 determines to use a task output generated by the task subsystem as the semantic output.

As another example, when the score distribution includes a score for the null combination, the set of rules can specify that the gating subsystem not use conversational output, i.e., and instead use the task output, if the score for the null combination exceeds a threshold score.

In the example of FIG. 2A, the gating subsystem 160 has determined not to use the task subsystem 150 and instead provides the conversational intent defined by the conversational output 148 as the semantic output 132.

Figure 2B:
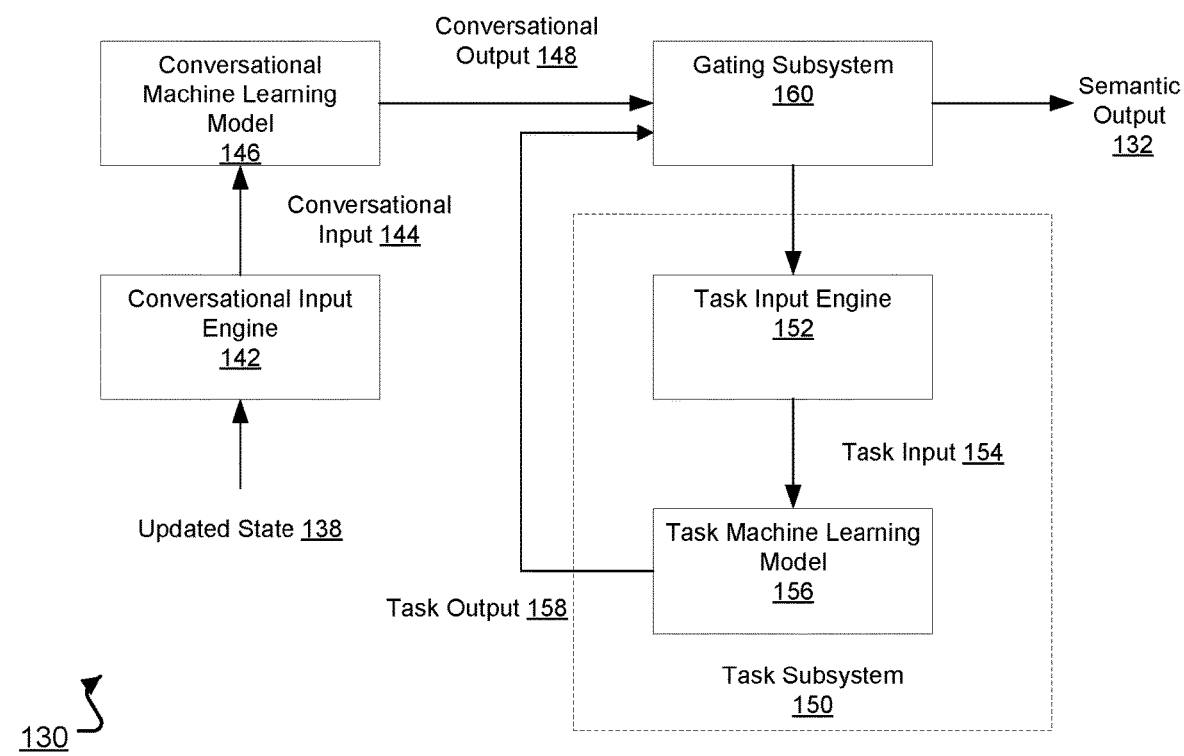

FIG. 2B shows another example configuration of the conversational system 130. In the example of FIG. 2B, the gating subsystem 160 has determined to augment or replace the conversational output 148 with a task output 158 before generating the semantic output 132.

In particular, in the example of FIG. 2B, the task subsystem 140 includes a task input engine 152 that generates a task input 154 from the semantic input 122 and a task subsystem also includes a task machine learning model 156 that processes the task input 154 to generate the task output 158.

As with the conversational machine learning model 146, the task machine learning model 156 is also conditioned on the updated state of the current conversation. Unlike the conversational machine learning model 146, however, the task machine learning model 156 is specific to the particular task. Therefore, the task input engine 152 can encode the updated state 138 and, optionally, the semantic input, numerically in a task-specific manner, e.g., by one-hot encoding the intent and slot values in the updated state 138 to generate the task input 154.

While the task subsystem 150 is shown in FIG. 2B as including a machine learning model, in some other implementations, the task subsystem 150 applies a set of task-specific rules to the current conversation state and the semantic input 122 to generate the task output 158. In these cases, the task subsystem 150 may apply the set of rules directly to the updated state 138 (and, optionally, the semantic input) without needing to first numerically encode the state.

While FIGS. 2A and 2B show that the system first performs the processing of the conversational subsystem 140 and then determines whether to use the task subsystem 150, in some cases the system first uses the task subsystem 150 and then determines whether to invoke the conversational subsystem 140 based on the task output.

In particular, in some cases the task output generated by the task subsystem defines whether the conversational subsystem 140 should be invoked to generate a grounding output or to progress the conversation through a subtask. When the task output indicates that the conversational subsystem should be invoked, the system can cause the conversational input engine 142 to generate a conversational input as described above.

For example, the task subsystem 150 can generate an output that identifies possible values for a particular slot and indicates that the conversational subsystem 140 should generate an output that asks the user to select a value from the possible values. The input to conversational subsystem 140 can then identify, in a genericized manner, the slot in question and how many possible values the slot has without requiring the conversational subsystem 140 to identify the actual possible values for the slot.

Figure 3:
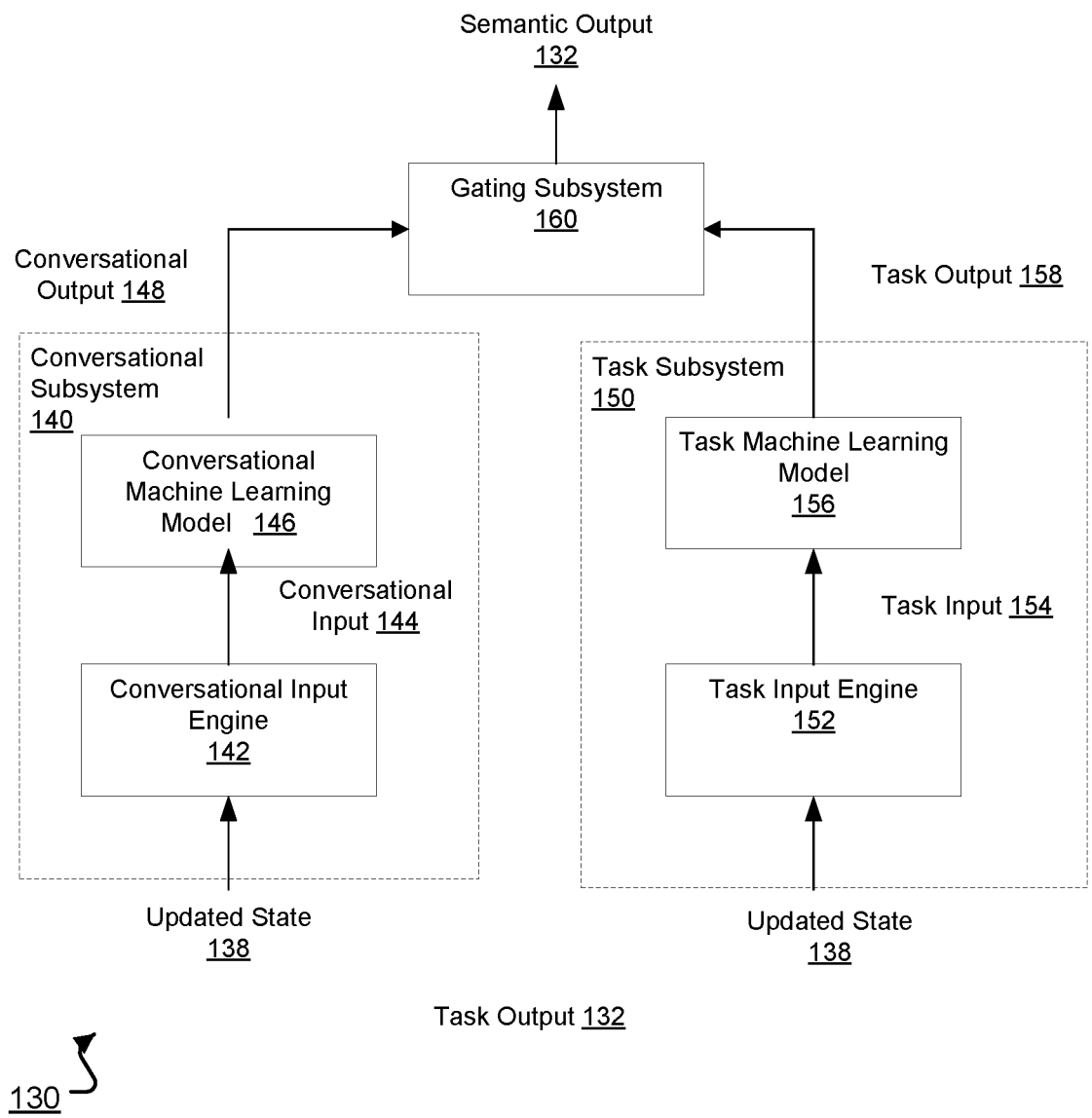

FIG. 3 shows another example configuration of the conversational system 130. In the example of FIG. 3, the gating machine learning model 162 receives both the conversational output 148 and the task output 158.

That is, rather than receiving the conversational output 148 and determining whether to use the conversational output 148 or to obtain an additional output from the task subsystem 150 as in the example of FIGS. 2A and 2B, in the example of FIG. 3, the gating subsystem 160 receives both the conversational output 148 and the task output 158 and generates the semantic output 132 from both outputs. For example, the conversational subsystem 140 and the task subsystem 150 can operate on the semantic input 122 in parallel to generate their respective outputs.

For example, the gating subsystem 150 can select between the conversational output 148 and the task output 158 and provide the intent defined by the selected output as the semantic output 132. For example, the gating subsystem 150 can select the conversational output when there is sufficient uncertainty in the updated state or the current semantic input, as described above. As another example, the gating subsystem 150 can compare the spread of the two score distributions and determine which output to select based on the spread. For example, if the conversational machine learning model is very confident that a particular grounding response should be generated while the task machine learning model is not confident in any one task-specific response, the gating subsystem 150 can select the particular grounding response (or, more specifically, the conversational intent-value combination that defines the grounding response) as the semantic output.

Figure 4:
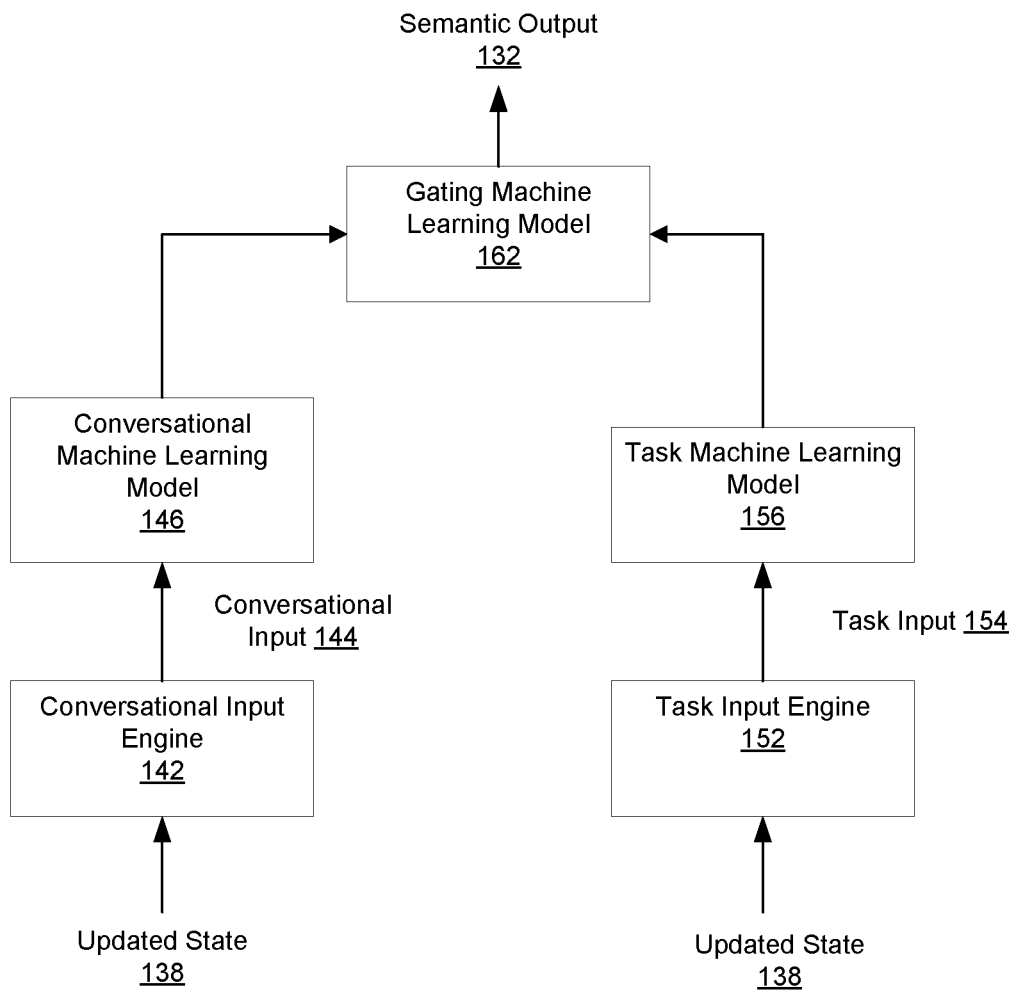

FIG. 4 shows yet another example configuration of the conversational system 130. In the example of FIG. 4, the gating subsystem 150 implements a gating machine learning model 162.

The gating machine learning model 162 is configured to receive outputs generated by both the conversational machine learning model 146 and the task machine learning model 156 and to process these network outputs to generate the semantic output 132.

In these cases, the gating machine learning model 162 generates as output a score distribution over a set of possible intent-slot combinations that includes both conversational intents and task-specific intents.

The input to the gating machine learning model 162, i.e., the outputs generated by the conversational machine learning model 146 and the task machine learning model 156 can also be respective score distributions or can be feature vectors.

For example, the gating machine learning model 162 can be a feedforward neural network that includes one or more fully-connected layers followed by a softmax output layer.

When the gating subsystem 150 implements the gating machine learning model 162, the gating machine learning model 162 can be trained jointly with the conversational machine learning model and the task machine learning model, i.e., after the conversational machine learning model and the task machine learning model have been pre-trained on multi-task and task-specific training data, respectively. Alternatively, after the pre-training, the values of the parameters of the conversational machine learning model and the task machine learning model can be held fixed while the gating machine learning model 162 is trained.

Figure 5:
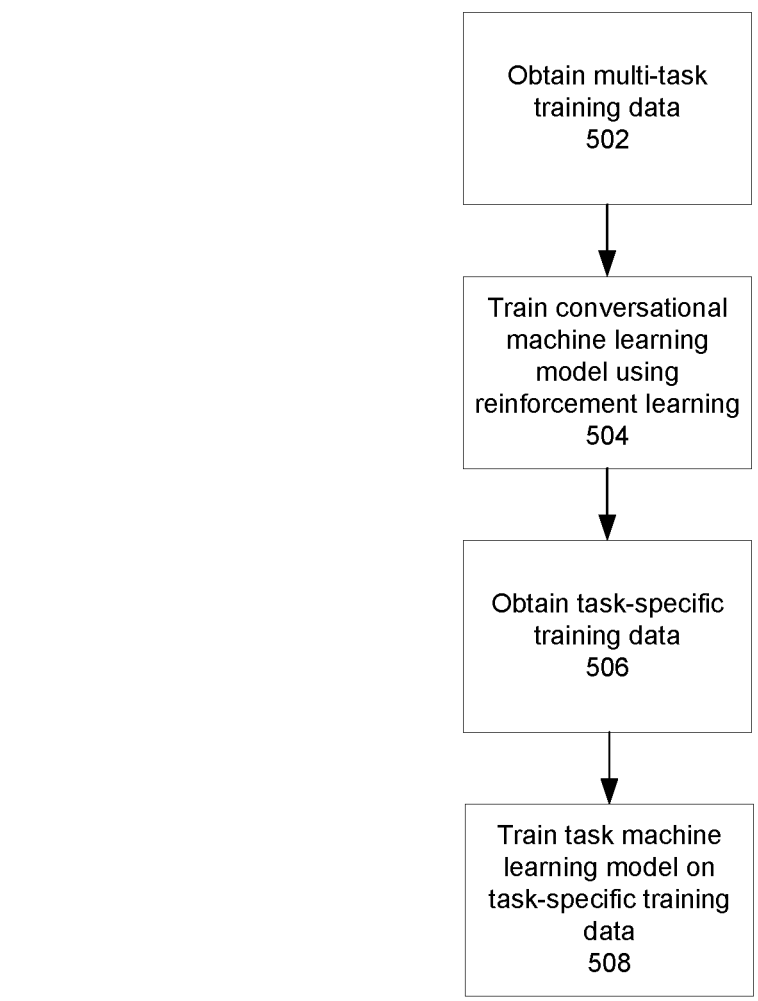
FIG. 5 is a flow diagram of an example process of training a conversational machine learning model.

FIG. 5 is a flow diagram of an example process 500 for training a conversational machine learning model. For convenience, the process 500 will be described as being performed by a system of one or more computers located in one or more locations. For example, a dialogue system, e.g., the dialogue system 100 of FIG. 1, appropriately programmed, can perform the process 500.

The system obtains multi-task training data (step 502).

The multi-task training data includes multiple sequences of conversational inputs. Each sequence of conversational inputs is a sequence of inputs that was received during a single conversation. While each conversation corresponds to a single task, the multi-task training data includes sequences from conversations corresponding to multiple different tasks.

For each conversational input, the multi-task training data also includes the conversational output that was generated in response to the conversational input and a reward that measures the quality of the conversational output.

The reward can include any observable metrics that relate to the quality of the conversational outputs and that are being optimized by the training.

For example, the reward can include a metric that measures whether the task was ultimately successful, i.e., if after the conversational output was generated the user was able to achieve the goal of the user in interacting with the system.

As another example, the reward can include a metric that measures conversation length, e.g., in terms of number of user inputs submitted after the conversational output was generated and before the task was completed, with fewer subsequent user inputs resulting in a higher reward.

As yet another example, the reward can include other metrics that should influence the conversational outputs generated by the conversational machine learning model, e.g., monetization metrics, marketing metrics, and so on.

The system trains the conversational machine learning model on the multi-task training data using a reinforcement learning training technique to determine trained values of the parameters of the conversational machine learning model (step 504). In particular, the system trains the conversational machine learning model to generate conversational outputs that maximize expected return, i.e., a time-discounted sum of future rewards, using the reinforcement learning technique. For example, the reinforcement learning technique can be a conventional policy gradient based technique, e.g., REINFORCE.

As described above, in some cases, the reinforcement learning technique is an off-policy reinforcement learning technique, i.e., because generating the multi-task training data is de-coupled from training the conversational machine learning model on the multi-task training data.

In some other cases, however, the system trains the conversational machine learning model using an on-policy reinforcement learning technique. In an on-policy approach, a batch of multi-task training data is generated by processing conversational inputs in accordance with the current values of the parameters of the conversational machine learning model and the conversational machine learning model is trained on the batch to update the current values of the parameters. That is, the system can use the conversational machine learning model to generate an output, determine a reward based on the output based on the factors described above, and then use the reward to train the conversational machine learning model.

Additionally, in some cases, as part of training the conversational machine learning model, the system also back-propagates gradients to update the parameters of an embedding neural network layer that is used to generate the conversational inputs.

The system obtains task-specific training data (step 506). The task specific training data includes a set of training task inputs and, for each training task input, a ground truth task output, i.e., the task output that should be generated for the task input by the task machine learning model.

The system trains the task machine learning model on the task-specific training data using supervised learning to determine trained values of the parameters of the task machine learning model (step 508). That is, the system trains the task machine learning model to generate task outputs that match the ground truth task outputs using supervised learning, e.g., using stochastic gradient descent with backpropagation or another conventional supervised learning technique.

In other cases, the task-specific training data can instead include task-specific training input-reward pairs and the task machine learning model can be trained using reinforcement learning to generate task outputs that maximize expected returns. As with the rewards for the training of the conversational machine learning model, the reward can include any observable metric that is being optimized by the training.

The above description describes that the semantic inputs and outputs generated by the system are represented using intent-slot combinations. However, one of ordinary skill in the art would appreciate that many other representations of the semantics of a user input and a system output are possible. For example, the techniques described above could be used with the semantics of inputs and outputs represented as logical forms (first order logic, lambda calculus, and so on), graph-based representations, and other representation techniques.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    obtaining, by a computer-implemented dialogue system and during a conversation between the computer-implemented dialogue system and a user to complete a particular task, a text input from the user; and
    without receiving any additional text inputs from the user:
        obtaining, by the computer-implemented dialogue system, a state of the conversation with the user that has been updated based on the text input, wherein obtaining the state of the conversation includes:
            generating a semantic input representing the text input; and
            updating a previous state of the conversation based on the semantic input;
        generating, by the computer-implemented dialogue system and from the state, a conversational output that defines a conversational response to the text input that is independent of the particular task, wherein the conversational output includes a score distribution over a plurality of possible intent-slot value combinations; and
        determining, by the computer-implemented dialogue system and from at least one of the score distribution included in the conversational output or the state of the conversation, whether to (i) provide the conversational response to the text input or (ii) generate a task output that is specific to the particular task.

2. The method of claim 1, wherein determining, by the computer-implemented dialogue system and from at least one of the conversational output or the state of the conversation, whether to (i) provide the conversational response to the text input or (ii) generate a task output that is specific to the particular task comprises:
    applying a set of one or more rules to the conversational output, the state, or both.

3. The method of claim 1, further comprising:

in response to determining to generate the task output, generating, using the state, the task output, wherein the task output defines a task-specific response to provide the user; and
providing the task-specific response to the user.

4. The method of claim 1, further comprising:
in response to determining to generate the task output:
generating, using the state, the task output, wherein the task output defines a task-specific response to the text input;
generating an augmented response to the text input, wherein the augmented response to the text input is generated based on both the score distribution included in the conversational response to the text input and the task-specific response to the text input; and
providing the augmented response to the user.

5. The method of claim 1, wherein the task output includes a score distribution over a second plurality of possible intent-slot value combinations.

6. The method of claim 1, wherein generating the conversational output comprises:
generating, from the state, a conversational input that removes task-dependent aspects of the state while maintaining a conversational context of the conversation; and
generating the conversational output using the conversational input.

7. The method of claim 6, wherein generating the conversational output using the conversational input comprises processing the conversational output using a conversational machine learning model that has been trained to process the conversational input to generate a conversational output that is independent of a task that is being performed.

8. The method of claim 7, wherein the conversational machine learning model has been trained on training data generated from multiple different tasks.

9. The method of claim 6, wherein the state comprises one or more intents each having one or more slots and, for each of the one or more slots, one or more possible values for the slot or data indicating that a value for the slot has not been provided during the conversation.

10. The method of claim 9, wherein generating the conversational input comprises genericizing the intents and slots in the state.

11. The method of claim 9, wherein generating the conversational input comprises mapping the intents and slots in the state to respective feature vectors in a feature space that is shared across multiple tasks.

12. A method comprising:
obtaining, by a computer-implemented dialogue system and during a conversation between the computer-implemented dialogue system and the user to complete a particular task, a text input from the user; and
without receiving any additional text inputs from the user:
obtaining, by the computer-implemented dialogue system, a state of the conversation with the user that has been updated based on the text input, wherein obtaining the state of the conversation includes:
generating a semantic input representing the text input; and
updating a previous state of the conversation based on the semantic input;
generating, by the computer-implemented dialogue system and from the state, a conversational output that defines a conversational response to the text input that is independent of the particular task, wherein the conversational output includes a score distribution over a plurality of possible intent-slot value combinations;
generating, by the computer-implemented dialogue system and from the state, a task output that defines a task response to the text input that is specific to the particular task;
generating, by the computer-implemented dialogue system and based on the score distribution included in the conversational output and the task output, a final response to the text input; and
providing, by the computer-implemented dialogue system, the final response to the user.

13. The method of claim 12, wherein determining the final response comprises:
selecting an output from the conversational output or the task output; and
generating the final response based on the selected output.

14. The method of claim 13, wherein determining the final response comprises:
processing the conversational output and the task output using a gating machine learning model to generate a combined output; and
generating the final response based on the combined output.

15. The method of claim 12, wherein the task output includes a score distribution over a second plurality of possible intent-slot value combinations.

16. The method of claim 15, wherein generating a final response to the text input comprises comparing the score distribution included in the conversational output to the score distribution included in the task output.

17. A method comprising:
obtaining, by a computer-implemented dialogue system and during a conversation between the computer-implemented dialogue system and the user to complete a particular task, a text input from the user; and
without receiving any additional text inputs from the user:
obtaining, by the computer-implemented dialogue system, a state of the conversation with the user that has been updated based on the text input, wherein obtaining the state of the conversation includes:
generating a semantic input representing the text input; and
updating a previous state of the conversation based on the semantic input;
generating, by the computer-implemented dialogue system and from the state, a task output that defines a task response to the text input that is specific to the particular task;
determining, by the computer-implemented dialogue system and from the task output, that responding to the text input requires a conversational output that is shared between multiple tasks;
in response, generating, by the computer-implemented dialogue system and from the state, a conversational output that defines a conversational response to the text input that is independent of the particular task, wherein the conversational output includes a score distribution over a plurality of possible intent-slot value combinations; and
generating a final response to the text input based on the task output and the score distribution included in the conversational output.

18. The method of claim 17, wherein the task output includes a score distribution over a second plurality of possible intent-slot value combinations.

19. A non-transitory computer-readable storage medium storing one or more programs, the one or more programs comprising instructions, which when executed by one or more processors of an electronic device, cause the electronic device to:
  obtain, by a computer-implemented dialogue system and during a conversation between the computer-implemented dialogue system and a user to complete a particular task, a text input from the user; and
  without receiving any additional text inputs from the user:
    obtain, by the computer-implemented dialogue system, a state of the conversation with the user that has been updated based on the text input, wherein obtaining the state of the conversation includes:
      generating a semantic input representing the text input; and
      updating a previous state of the conversation based on the semantic input;
    generate, by the computer-implemented dialogue system and from the state, a conversational output that defines a conversational response to the text input that is independent of the particular task, wherein the conversational output includes a score distribution over a plurality of possible intent-slot value combinations; and
    determine, by the computer-implemented dialogue system and from at least one of the score distribution included in the conversational output or the state of the conversation, whether to (i) provide the conversational response to the text input or (ii) generate a task output that is specific to the particular task.

20. The non-transitory computer-readable storage medium of claim 19, wherein determining, by the computer-implemented dialogue system and from at least one of the conversational output or the state of the conversation, whether to (i) provide the conversational response to the text input or (ii) generate a task output that is specific to the particular task comprises:
  applying a set of one or more rules to the conversational output, the state, or both.

21. The non-transitory computer-readable storage medium of claim 19, wherein the one or more programs further comprise instructions, which when executed by the one or more processors, cause the electronic device to:
  in response to determining to generate the task output, generate, using the state, the task output, wherein the task output defines a task-specific response to provide the user; and
  provide the task-specific response to the user.

22. The non-transitory computer-readable storage medium of claim 19, wherein the one or more programs further comprise instructions, which when executed by the one or more processors, cause the electronic device to:
  in response to determining to generate the task output:
    generate, using the state, the task output, wherein the task output defines a task-specific response to the text input;
    generate an augmented response to the text input, wherein the augmented response to the text input is generated based on both the score distribution included in the conversational response to the text input and the task-specific response to the text input; and provide the augmented response to the user.

23. The non-transitory computer-readable storage medium of claim 19, wherein the task output includes a score distribution over a second plurality of possible intent-slot value combinations.

24. The non-transitory computer-readable storage medium of claim 19, wherein generating the conversational output comprises:
  generating, from the state, a conversational input that removes task-dependent aspects of the state while maintaining a conversational context of the conversation; and
  generating the conversational output using the conversational input.

25. The non-transitory computer-readable storage medium of claim 24, wherein generating the conversational output using the conversational input comprises processing the conversational output using a conversational machine learning model that has been trained to process the conversational input to generate a conversational output that is independent of a task that is being performed.

26. The non-transitory computer-readable storage medium of claim 25, wherein the conversational machine learning model has been trained on training data generated from multiple different tasks.

27. The non-transitory computer-readable storage medium of claim 24, wherein the state comprises one or more intents each having one or more slots and, for each of the one or more slots, one or more possible values for the slot or data indicating that a value for the slot has not been provided during the conversation.

28. The non-transitory computer-readable storage medium of claim 27, wherein generating the conversational input comprises genericizing the intents and slots in the state.

29. The non-transitory computer-readable storage medium of claim 27, wherein generating the conversational input comprises mapping the intents and slots in the state to respective feature vectors in a feature space that is shared across multiple tasks.

30. A non-transitory computer-readable storage medium storing one or more programs, the one or more programs comprising instructions, which when executed by one or more processors of an electronic device, cause the electronic device to:
  obtain, by a computer-implemented dialogue system and during a conversation between the computer-implemented dialogue system and the user to complete a particular task, a text input from the user; and
  without receiving any additional text inputs from the user:
    obtain, by the computer-implemented dialogue system, a state of the conversation with the user that has been updated based on the text input, wherein obtaining the state of the conversation includes:
      generating a semantic input representing the text input; and
      updating a previous state of the conversation based on the semantic input;
    generate, by the computer-implemented dialogue system and from the state, a conversational output that defines a conversational response to the text input that is independent of the particular task, wherein the conversational output includes a score distribution over a plurality of possible intent-slot value combinations;
    generate, by the computer-implemented dialogue system and from the state, a task output that defines a task response to the text input that is specific to the particular task;
    generate, by the computer-implemented dialogue system and based on the score distribution included in the conversational output and the task output, a final response to the text input; and
provide, by the computer-implemented dialogue system, the final response to the user.

31. The non-transitory computer-readable storage medium of claim 30, wherein determining the final response comprises:
selecting an output from the conversational output or the task output; and
generating the final response based on the selected output.

32. The non-transitory computer-readable storage medium of claim 31, wherein determining the final response comprises:
processing the conversational output and the task output using a gating machine learning model to generate a combined output; and
generating the final response based on the combined output.

33. The non-transitory computer-readable storage medium of claim 30, wherein the task output includes a score distribution over a second plurality of possible intent-slot value combinations.

34. The non-transitory computer-readable storage medium of claim 33, wherein generating a final response to the text input comprises comparing the score distribution included in the conversational output to the score distribution included in the task output.

35. A non-transitory computer-readable storage medium storing one or more programs, the one or more programs comprising instructions, which when executed by one or more processors of an electronic device, cause the electronic device to:
obtain, by a computer-implemented dialogue system and during a conversation between the computer-implemented dialogue system and the user to complete a particular task, a text input from the user; and
without receiving any additional text inputs from the user:
obtain, by the computer-implemented dialogue system, a state of the conversation with the user that has been updated based on the text input, wherein obtaining the state of the conversation includes:
generating a semantic input representing the text input; and
updating a previous state of the conversation based on the semantic input;
generate, by the computer-implemented dialogue system and from the state, a task output that defines a task response to the text input that is specific to the particular task;
determine, by the computer-implemented dialogue system and from the task output, that responding to the text input requires a conversational output that is shared between multiple tasks;
in response, generate, by the computer-implemented dialogue system and from the state, a conversational output that defines a conversational response to the text input that is independent of the particular task, wherein the conversational output includes a score distribution over a plurality of possible intent-slot value combinations; and
generate a final response to the text input based on the task output and the score distribution included in the conversational output.

36. The non-transitory computer-readable storage medium of claim 35, wherein the task output includes a score distribution over a second plurality of possible intent-slot value combinations.

37. An electronic device, comprising:
one or more processors;
a memory; and
one or more programs, wherein the one or more programs are stored in the memory and configured to be executed by the one or more processors, the one or more programs including instructions for:
obtaining, by a computer-implemented dialogue system and during a conversation between the computer-implemented dialogue system and a user to complete a particular task, a text input from the user; and
without receiving any additional text inputs from the user:
obtaining, by the computer-implemented dialogue system, a state of the conversation with the user that has been updated based on the text input, wherein obtaining the state of the conversation includes:
generating a semantic input representing the text input; and
updating a previous state of the conversation based on the semantic input;
generating, by the computer-implemented dialogue system and from the state, a conversational output that defines a conversational response to the text input that is independent of the particular task, wherein the conversational output includes a score distribution over a plurality of possible intent-slot value combinations; and
determining, by the computer-implemented dialogue system and from at least one of the score distribution included in the conversational output or the state of the conversation, whether to (i) provide the conversational response to the text input or (ii) generate a task output that is specific to the particular task.

38. The electronic device of claim 37, wherein determining, by the computer- implemented dialogue system and from at least one of the conversational output or the state of the conversation, whether to (i) provide the conversational response to the text input or (ii) generate a task output that is specific to the particular task comprises:
applying a set of one or more rules to the conversational output, the state, or both.

39. The electronic device of claim 37, the one or more programs further comprising instructions for:
in response to determining to generate the task output, generating, using the state, the task output, wherein the task output defines a task-specific response to provide the user; and
providing the task-specific response to the user.

40. The electronic device of claim 37, the one or more programs further comprising instructions for:
in response to determining to generate the task output:
generate, using the state, the task output, wherein the task output defines a task-specific response to the text input;
generate an augmented response to the text input, wherein the augmented response to the text input is generated based on both the score distribution included in the conversational response to the text input and the task-specific response to the text input; and
provide the augmented response to the user.

41. The electronic device of claim 40, wherein the task output includes a score distribution over a second plurality of possible intent-slot value combinations.

42. The electronic device of claim 37, wherein generating the conversational output comprises:

generating, from the state, a conversational input that removes task-dependent aspects of the state while maintaining a conversational context of the conversation; and generating the conversational output using the conversational input.

43. The electronic device of claim 42, wherein generating the conversational output using the conversational input comprises processing the conversational output using a conversational machine learning model that has been trained to process the conversational input to generate a conversational output that is independent of a task that is being performed.

44. The electronic device of claim 43, wherein the conversational machine learning model has been trained on training data generated from multiple different tasks.

45. The electronic device of claim 42, wherein the state comprises one or more intents each having one or more slots and, for each of the one or more slots, one or more possible values for the slot or data indicating that a value for the slot has not been provided during the conversation.

46. The electronic device of claim 45, wherein generating the conversational input comprises genericizing the intents and slots in the state.

47. The electronic device of claim 45, wherein generating the conversational input comprises mapping the intents and slots in the state to respective feature vectors in a feature space that is shared across multiple tasks.

48. An electronic device, comprising:
one or more processors;
a memory; and
one or more programs, wherein the one or more programs are stored in the memory and configured to be executed by the one or more processors, the one or more programs including instructions for:
obtaining, by a computer-implemented dialogue system and during a conversation between the computer-implemented dialogue system and the user to complete a particular task, a text input from the user; and
without receiving any additional text inputs from the user:
obtaining, by the computer-implemented dialogue system, a state of the conversation with the user that has been updated based on the text input, wherein obtaining the state of the conversation includes:
generating a semantic input representing the text input; and
updating a previous state of the conversation based on the semantic input;
generating, by the computer-implemented dialogue system and from the state, a conversational output that defines a conversational response to the text input that is independent of the particular task, wherein the conversational output includes a score distribution over a plurality of possible intent-slot value combinations;
generating, by the computer-implemented dialogue system and from the state, a task output that defines a task response to the text input that is specific to the particular task;
generating, by the computer-implemented dialogue system and based on the score distribution included in the conversational output and the task output, a final response to the text input; and providing, by the computer-implemented dialogue system, the final response to the user.

49. The electronic device of claim 48, wherein determining the final response comprises:
selecting an output from the conversational output or the task output; and
generating the final response based on the selected output.

50. The electronic device of claim 49, wherein determining the final response comprises:
processing the conversational output and the task output using a gating machine learning model to generate a combined output; and
generating the final response based on the combined output.

51. The electronic device of claim 50, wherein the task output includes a score distribution over a second plurality of possible intent-slot value combinations.

52. The electronic device of claim 51, wherein generating a final response to the text input comprises comparing the score distribution included in the conversational output to the score distribution included in the task output.

53. An electronic device, comprising:
one or more processors;
a memory; and
one or more programs, wherein the one or more programs are stored in the memory and configured to be executed by the one or more processors, the one or more programs including instructions for:
obtaining, by a computer-implemented dialogue system and during a conversation between the computer-implemented dialogue system and the user to complete a particular task, a text input from the user; and
without receiving any additional text inputs from the user:
obtaining, by the computer-implemented dialogue system, a state of the conversation with the user that has been updated based on the text input, wherein obtaining the state of the conversation includes:
generating a semantic input representing the text input; and
updating a previous state of the conversation based on the semantic input;
generating, by the computer-implemented dialogue system and from the state, a task output that defines a task response to the text input that is specific to the particular task;
determining, by the computer-implemented dialogue system and from the task output, that responding to the text input requires a conversational output that is shared between multiple tasks;
in response, generating, by the computer-implemented dialogue system and from the state, a conversational output that defines a conversational response to the text input that is independent of the particular task, wherein the conversational output includes a score distribution over a plurality of possible intent-slot value combinations; and
generating a final response to the text input based on the task output and the score distribution included in the conversational output.

54. The electronic device of claim 53, wherein the task output includes a score distribution over a second plurality of possible intent-slot value combinations.

* * * * *